United States Patent
Suzuki

(10) Patent No.: US 8,459,149 B2
(45) Date of Patent: Jun. 11, 2013

(54) DRIVING FORCE DISTRIBUTION DEVICE

(75) Inventor: Satoru Suzuki, Kosai (JP)

(73) Assignee: Univance Corporation, Kosai-shi, Shizuoka (JP)

( * ) Notice: Subject to any disclaimer, the term of this patent is extended or adjusted under 35 U.S.C. 154(b) by 128 days.

(21) Appl. No.: 13/235,668

(22) Filed: Sep. 19, 2011

(65) Prior Publication Data

US 2012/0096986 A1 Apr. 26, 2012

(30) Foreign Application Priority Data

Oct. 26, 2010 (JP) ................................ 2010-239706

(51) Int. Cl.
*F16H 37/06* (2006.01)
(52) U.S. Cl.
USPC ................ 74/665 GE; 74/665 G; 74/665 GA
(58) Field of Classification Search
USPC ................ 74/665 F, 665 G, 665 GA, 665 GE
See application file for complete search history.

(56) References Cited

U.S. PATENT DOCUMENTS

| 5,584,776 | A | * | 12/1996 | Weilant et al. ................ 475/213 |
| 5,613,587 | A | * | 3/1997 | Baxter, Jr. .................. 192/53.32 |
| 5,649,459 | A | * | 7/1997 | Murakami et al. ........ 74/665 GE |
| 5,915,513 | A | * | 6/1999 | Isley et al. ....................... 192/35 |
| 6,101,897 | A | * | 8/2000 | Showalter ................ 74/665 GE |
| 2007/0209462 | A1 | | 9/2007 | Suzuki et al. |

FOREIGN PATENT DOCUMENTS

JP 2007-176329 12/2007

* cited by examiner

*Primary Examiner* — Ha D Ho
(74) *Attorney, Agent, or Firm* — Roberts Mlotkowski Safran & Cole P.C.

(57) ABSTRACT

A driving force distribution device includes a sub transmission, a friction clutch, a rotary drive member fixed to an output shaft of an actuator, a friction clutch driving cam to change a pressing force of the friction clutch, a shift cam to shift the sub transmission by converting rotary motion of the actuator into linear motion, and a ratchet lever provided so that a shaft line thereof in a normal direction with respect to the outer surface of the rotary drive member is a rotation center. The ratchet lever is disengaged from the shift cam and is rotated when the rotary drive member is rotationally driven to one side from a predetermined position starting at control origin of the shift cam, and the ratchet lever is rotated in conjunction with the shift cam when the rotary drive member is rotationally driven in a direction opposite to the one side.

7 Claims, 10 Drawing Sheets

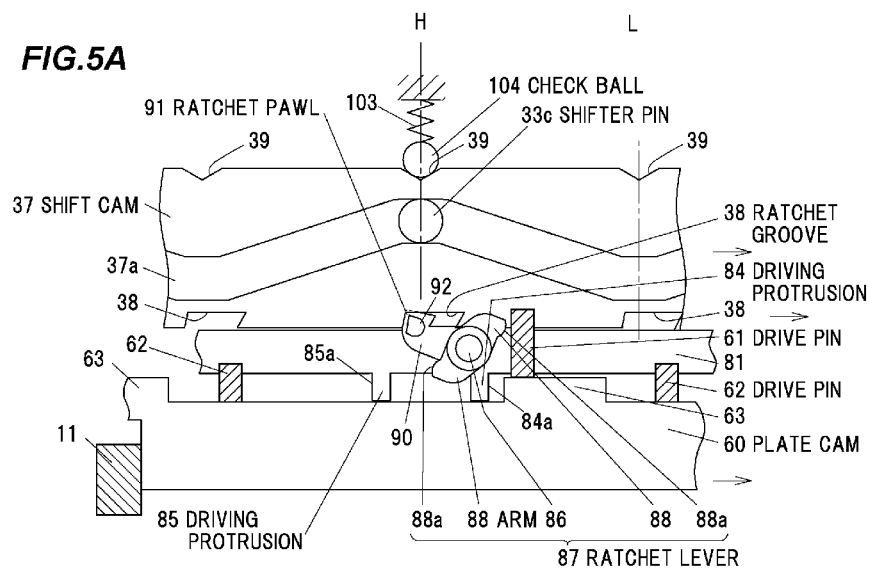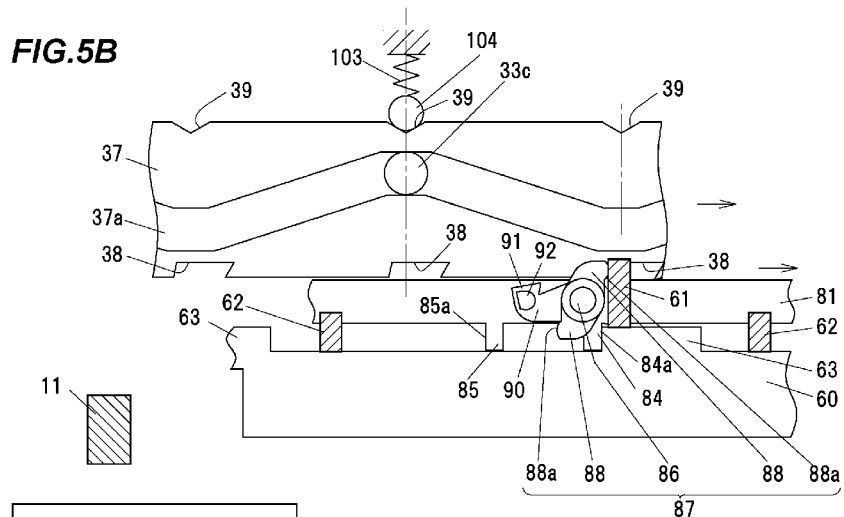

DRIVING FORCE DISTRIBUTION DEVICE

The present application is based on Japanese Patent Application No. 2010-239706 filed on Oct. 26, 2010, the entire contents of which are incorporated herein by reference.

BACKGROUND OF THE INVENTION

1. Field of the Invention

The invention relates to a driving force distribution device for controlling distribution of a driving force to front and rear wheels or to right and left wheels of a vehicle.

2. Description of the Related Art

For example, JP-A-2007-176329 discloses a driving force distribution device for a four-wheel-drive vehicle in which a shift of a sub transmission and a clutch pressing force of a friction clutch are controlled by a single actuator.

The driving force distribution device disclosed in JP-A-2007-176329 is provided with a sub transmission for switching a rotational driving force from an output shaft between two levels, a high speed and a low speed, and transmitting the rotational driving force to a primary output shaft, a friction clutch for transmitting the rotational driving force of the primary output shaft to a secondary output shaft and a ball cam plate for changing a clutch pressing force of the friction clutch in accordance with rotary drive of an actuator.

The driving force distribution device is provided with a rotary drive member coaxially fixed to an output shaft of the actuator. A shifting cylindrical cam for moving a shift fork connected to the sub transmission and a pinion gear engaged with a drive gear of the ball cam plate are respectively arranged on both axial sides of the rotary drive member so as to be relatively rotatable.

Clockwise rotation of the rotary drive member caused by the actuator is transmitted to the pinion gear, and the clutch pressing force of the friction clutch generated by the ball cam plate via the drive gear is changed in response to the rotation of the pinion gear. Rotary motion of the shifting cylindrical cam generated by counterclockwise rotation of the rotary drive member is converted into linear motion by the shift fork, thereby shifting the sub transmission.

A sliding ratchet attached to the rotary drive member so as to be movable in a rotation axis direction is provided so as to be freely coming in and out of a ratchet groove which is formed on an end face of the shifting cylindrical cam. When the ratchet is fitted to the ratchet groove, counterclockwise rotary drive of the rotary drive member is transmitted to the shifting cylindrical cam and the sub transmission is alternately and repeatedly switched between high and low speeds by the shift fork in every reciprocating rotation of the shifting cylindrical cam.

SUMMARY OF THE INVENTION

The driving force distribution device disclosed in JP-A-2007-176329 is constructed such that the ratchet of the rotary drive member is moved along the ratchet groove of the shifting cylindrical cam in accordance with rotary drive of the rotary drive member to disengage the ratchet from the ratchet groove. In the construction, a range of circumferential rotation angle of the rotary drive member required for disengaging the ratchet from the ratchet groove is large and it is thus necessary to rotationally drive the actuator much more.

Accordingly, it is an object of the invention to provide a driving force distribution device that offers an improved response to a shift of a sum transmission and to a clutch pressing force of a friction clutch.

(1) According to one embodiment of the invention, a driving force distribution device comprises:

a sub transmission for switching motive power to an input shaft between at least two levels, a high speed and a low speed, and transmitting the motive power to a primary output shaft;

a friction clutch for transmitting the motive power of the primary output shaft to a secondary output shaft;

a rotary drive member fixed to an output shaft of an actuator;

a friction clutch driving cam coaxially and relatively rotatably arranged at one end portion of the rotary drive member to change a pressing force of the friction clutch;

a shift cam coaxially and relatively rotatably arranged at another end portion of the rotary drive member to shift the sub transmission by converting rotary motion of the actuator into linear motion; and a ratchet lever provided so that a shaft line thereof in a normal direction with respect to the outer surface of the rotary drive member is a rotation center, wherein the ratchet lever is disengaged from the shift cam and is rotated when the rotary drive member is rotationally driven to one side from a predetermined position starting at control origin of the shift cam, and the ratchet lever is rotated in conjunction with the shift cam when the rotary drive member is rotationally driven in a direction opposite to the one side.

In the above embodiment (1) of the invention, the following modifications and changes can be made.

(i) The ratchet lever comprises a drive pawl for rotating the shift cam by engaging with a ratchet groove formed on the shift cam, and an arm integrally formed with the drive pawl, the arm contacting with a drive pin provided on the friction clutch driving cam to rotate and retract the drive pawl to a released position where the drive pawl does not engage with the ratchet groove.

(ii) The rotary drive member comprises a first driving protrusion to rotate by contacting with a driven protrusion formed on the friction clutch driving cam to adjust a pressing force of the friction clutch when the rotary drive member is rotationally driven to the one side, and a second driving protrusion to contact with the driven protrusion to stop the rotary drive member when the rotary drive member is rotationally driven in a direction opposite to the one side, wherein the rotary drive member returns to the control origin after the second driving protrusion stops moving and the position of the sub transmission is shifted while the shift cam is in a stop state.

(iii) The driving force distribution device further comprises:

a shutter member for preventing engagement between the drive pawl and the ratchet groove by lying therebetween when the drive pawl is rotated and retracted to a released position not engaging with the ratchet groove by contacting the arm with the drive pin.

(iv) The driving force distribution device further comprises:

a check mechanism coaxially supported by the shift cam for determining the shift positions so as to correspond to two shift positions of the shift cam.

(v) The check mechanism comprises a retaining piece for stopping rotation of the shift cam, and the retaining piece is supported by a positioning rod that penetrates therethrough and prevents reverse rotation of the friction clutch driving cam.

(vi) The driving force distribution device further comprises:

a ball cam mechanism for displacing the friction clutch in an axis direction, wherein the ball cam mechanism comprises a pair of ball cams arranged coaxially with the friction clutch so as to be relatively rotatable each other and having a ball sandwiched between surfaces facing each other, one of the ball cams is fixedly supported by the positioning rod that prevents reverse rotation of the friction clutch driving cam, and another ball cam is driven via a cam follower that moves along a cam face of the friction clutch driving cam.

EFFECTS OF THE INVENTION

According to one embodiment of the invention, a driving force distribution device can be provided that offers an improved response to a shift of a sum transmission and to a clutch pressing force of a friction clutch.

BRIEF DESCRIPTION OF THE DRAWINGS

Next, the present invention will be explained in more detail in conjunction with appended drawings, wherein:

FIG. 5A is an explanatory diagram illustrating the assembled state of the shift/clutch control mechanism of the invention and FIG. 5B is an explanatory diagram illustrating clutch control;

DETAILED DESCRIPTION OF THE PREFERRED EMBODIMENTS

A preferred embodiment of the invention will be specifically described below in conjunction with the appended drawings.

Overall Structure of Transfer

Figure 1:
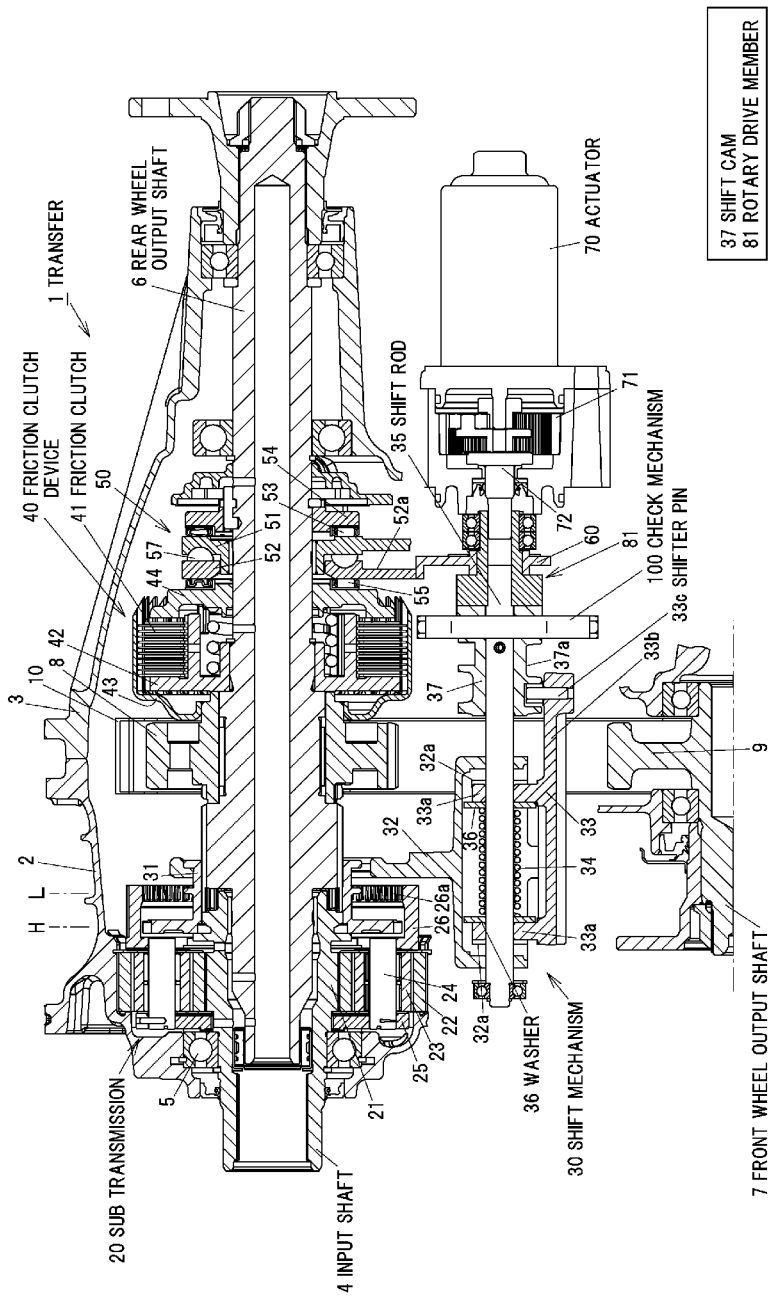
FIG. 1 is a schematic cross sectional view showing a structural example of a transfer in a typical embodiment of the present invention.

FIG. 1 schematically shows the overall structure of a typical transfer in the present embodiment which is indicated by a reference numeral 1. A transfer 1 in the illustrated example is used for, e.g., a four-wheel-drive (4WD) vehicle using a FR (front-engine rear-drive) system as a base.

As shown in FIG. 1, the transfer 1 has a transfer case composed of a front case 2 and a rear case 3. An input shaft 4 for inputting rotation from a non-illustrated engine via a non-illustrated automatic or manual transmission is fixedly supported at a front portion of the front case 2 so as to be rotatable. To the input shaft 4, a rear wheel output shaft 6 as a primary output shaft coaxially arranged therewith in the rear case 3 via a sub transmission 20 also coaxially arranged with the input shaft 4 in the front case 2 is directly connected.

A front wheel output shaft 7 which is a secondary output shaft with respect to the primary output shaft is provided on the transfer case at a position parallel to the rear wheel output shaft 6, as shown in FIG. 1. A drive sprocket gear 8 is provided coaxially with the rear wheel output shaft 6. A driven sprocket gear 9 corresponding to the drive sprocket gear 8 is coaxially provided at one end of the front wheel output shaft 7. An annular chain 10 passes over the drive sprocket gear 8 and the driven sprocket gear 9.

Referring to FIG. 1, a driving force of an engine input to the input shaft 4 is switched between a high speed stage H or a low speed stage L by a shift mechanism 30 of the sub transmission 20 to change running speed. The shift mechanism 30 is provided with an H-L switching clutch sleeve 31 arranged coaxially with a planetary gear mechanism of the sub transmission 20.

As shown in FIG. 1, the planetary gear mechanism is provided with a high-speed gear (sun gear) 21 formed on the outer periphery of the input shaft 4, a ring gear 22 fixed to the front case 2 and plural pinion gears (planetary gears) 23, . . . , 23 engaged with the outer periphery of the sun gear 21 as well as with the inner periphery of the ring gear 22.

The plural pinion gears 23 are rotatably and fixedly supported by a circular carrier case 25 via a support shaft 24 arranged with the same phase difference. The carrier case 25 is fixedly supported about the axis of the input shaft 4 so as to be relatively rotatable with respect to the sun gear 21. A circular ring body 26 having an internal spline (tooth portion) 26a is integrally fixed to a rear end portion of the carrier case 25. The support shaft 24 is fixedly supported at both edges thereof by the carrier case 25 and the circular ring body 26.

At low speed, a spline of the clutch sleeve 31 is disengaged from the sun gear 21 and is then splined to the internal spline 26a of the ring body 26, and the rotational power transmitted from the pinion gear 23 is transmitted as a low-speed rotational driving force to the rear wheel output shaft 6.

On the other hand, at high speed shown in FIG. 1, the spline of the clutch sleeve 31 and the high-speed gear 21 are engaged with and coupled to each other and the rotational driving force of the input shaft 4 is thus transmitted as a high-speed rotational driving force from the input shaft 4 to the rear wheel output shaft 6.

A friction clutch device 40, which constitutes a part of the driving force distribution device for controlling distribution of a driving force to front and rear wheels in 4WD mode, is provided coaxially with the rear wheel output shaft 6 as shown in FIG. 1. An actuator 70 which is a drive source to control operation of the shift mechanism 30 of the sub transmission 20 and that of the friction clutch device 40 is provided on the transfer case. The actuator 70 incorporates a reducer 71 for amplifying motor torque. Though an actuator output shaft 72, a rotational driving force from the reducer 71 is transmitted to the shift mechanism 30 and to the friction clutch device 40.

Structure of Shift Mechanism

As shown in FIG. 1, the shift mechanism 30 is mainly composed of two members, a fork main body 32 and a slide holder 33, which are relatively rotatable via a coil spring 34.

One side of the fork main body 32 is movably inserted through and supported by a shift rod 35. On another side of the fork main body 32, a fork with two prongs is extended and engaged with the H-L switching clutch sleeve 31. Inside two standing sidewalls of the fork main body 32 facing in a width direction, a pair of inwardly swollen long columnar spring load receiving portions 32a is each formed on both ends in an axis direction of the shift rod.

Meanwhile, the slide holder 33 is coaxially provided on the shift rod 35 via a pair of sliding legs 33a, 33a inserted through and supported by the shift rod 35 so as to be relatively movable with respect to the fork main body 32 as shown in FIG. 1. The sliding leg 33a is formed smaller than a distance between the spring load receiving portions 32a of the fork main body 32, and a distance between the pair of sliding legs 33a is set to be substantially equal to the distance between the two spring load receiving portions 32a paired in a length direction of the fork main body 32.

On facing inner surfaces of the pair of the sliding legs 33a, a pair of circular washers 36, 36 is arranged coaxially with the shift rod 35, as shown in FIG. 1. The washer 36 is formed to have a diameter greater than the distance between the two sliding legs 33a paired in a width direction of the fork main body 32. The pair of the sliding leg 33a and the washer 36 has both a spring holding function for holding both edges of the coil spring 34 and a spring operation function for operating the coil spring 34. A waiting mechanism is configured to accumulate a shift operation force by a compressing force and a restoring force of the coil spring 34 which are generated by relative movement of the spring load receiving portion 32a of the fork main body 32 and the sliding leg 33a of the slide holder 33.

An arm portion 33b extending along the shift rod 35 is integrally formed at a lengthwise end of the slide holder 33, as shown in FIG. 1. A cylindrical-shaped shifter pin 33c is supported at an end portion of the arm portion 33b in a protruding manner. The shifter pin 33c is loosely fitted, with a predetermined gap so as to be slidable, to a cam groove 37a which converts rotary motion of a shift cam 37 into linear motion of the shift mechanism 30. The configuration in which the shifter pin 33c is arranged not on the fork main body 32 side but on the shift cam 37 side via the arm portion 33b allows very small installation space in the device to be effectively used.

Referring to FIG. 1, the rotary motion of the shift cam 37 is transmitted to the slide holder 33 via the shifter pin 33c which moves along an inclined portion of the cam groove 37a, and is converted into linear motion of the slide holder 33. The linear motion causes linear motion of the fork main body 32 along the shift rod 35 via the coil spring 34. In the illustrated example, 180° counterclockwise rotation of the shift cam 37 moves the shifter pin 33c by the shift amount in an axis direction required to switch the sub transmission 20 between a position of the high speed stage H and a position of the low speed stage L. The clutch sleeve 31 for connecting/disconnecting the driving force via the fork main body 32 between the sun gear 21 and the pinion gear 23 of the sub transmission 20 is shifted by the linear motion of the fork main body 32, thereby switching to high or low speed.

Structure of Friction Clutch Device

Referring to FIG. 1, disconnection of a multi-plate friction clutch 41 in an annular shape is under the control of the friction clutch device 40. In the friction clutch 41, an annular clutch hub 42 is fixed to the rear wheel output shaft 6 and an annular clutch drum 43 is coupled to the drive sprocket gear 8 which is rotatably supported by the rear wheel output shaft 6.

In two-wheel drive (2WD) mode, engagement of the friction clutch 41 is released and the rotation of the input shaft 4 is transmitted to the rear wheel output shaft 6 via the sub transmission 20. In 4WD mode, on the other hand, the friction clutch 41 is in an engaged state and the driving force from the input shaft 4 is transmitted to the front wheel output shaft 7 via the rear wheel output shaft 6, the friction clutch 41, the drive sprocket gear 8, the front wheel drive chain 10 and the driven sprocket gear 9.

As shown in FIG. 1, the friction clutch device 40 is provided with an annular clutch pressing member 44 arranged coaxially with the rear wheel output shaft 6 so as to be movable, and a ball cam mechanism 50 for converting rotary motion of the actuator 70 into linear motion to displace the clutch pressing member 44 in an axis direction.

Figure 2:
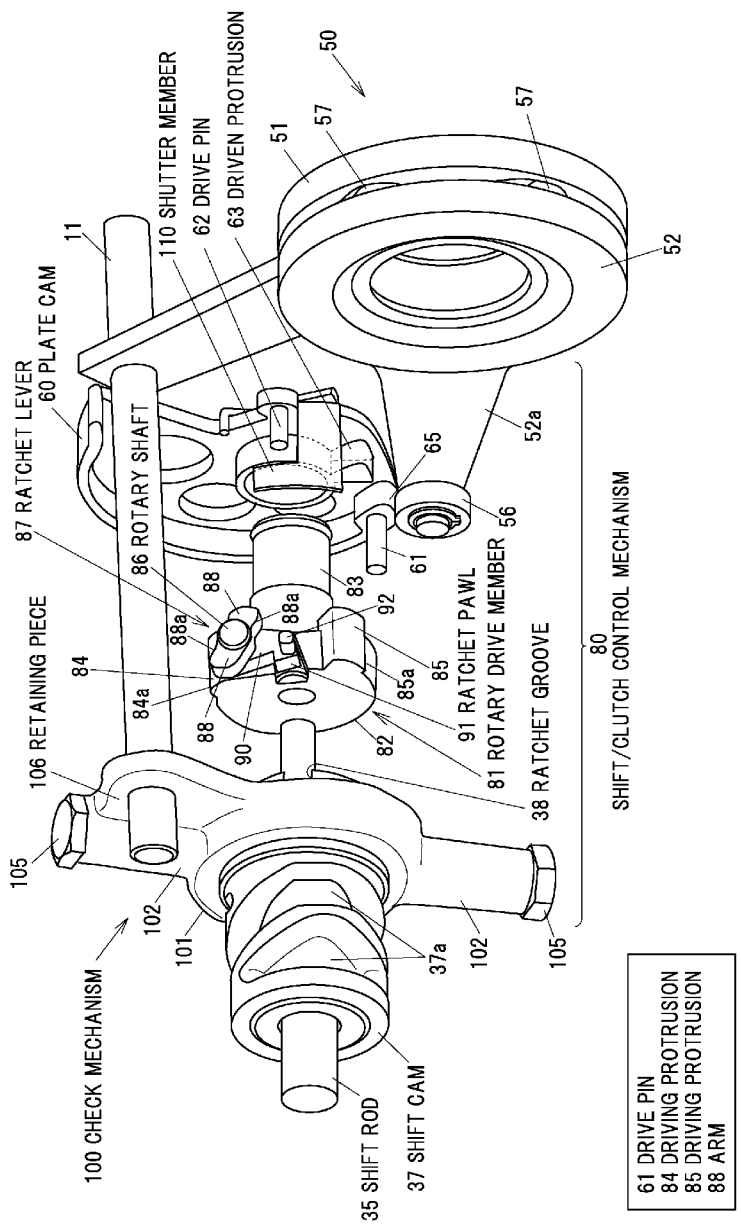
FIG. 2 is an exploded perspective view showing a shift/clutch control mechanism which is preferably used for a transfer of the invention.

Referring to FIGS. 1 and 2, the ball cam mechanism 50 controls a clutch engagement force of the friction clutch 41 to any levels. The ball cam mechanism 50 is provided with a pair of ball cams composed of a reaction-side cam plate (reaction cam plate) 51 and a drive-side cam plate (drive cam plate) 52 which are arranged coaxially with the rear wheel output shaft 6. The reaction cam plate 51 is fixed to an annular fixing member 54 via a thrust bearing 53. Meanwhile, the drive cam plate 52 contacts with and is connected to the clutch pressing member 44 via a thrust bearing 55.

As shown in FIG. 2, a free end of the reaction cam plate 51 which extends toward the actuator output shaft is supported by a positioning rod 11. The positioning rod 11 also has a function as a stopper for preventing reverse rotation of a friction clutch-driving plate cam 60 supported coaxially with the actuator output shaft 72 so as to be rotatable. Meanwhile, the drive cam plate 52 is integrally formed with a tapered arm portion 52a which extends toward the actuator output shaft so as to have a phase difference of a predetermined angle from the reaction cam plate 51. A cam follower 56 is axially supported at the end portion of the arm portion 52a so as to be rotatable. The cam follower 56 constantly contacts with a cam face of the plate cam 60 so as to transmit the rotation of the actuator 70 to the ball cam mechanism 50.

For engaging the friction clutch 41, the plate cam 60 is rotated clockwise in a forward rotational direction about a shaft center of the actuator output shaft 72, which makes the drive cam plate 52 rotationally drive in a certain direction with respect to the reaction cam plate 51. The drive cam plate 52 rotationally driven is moved in an axis direction of the rear wheel output shaft 6 by receiving pressure from a ball 57 in the ball cam mechanism. When the drive cam plate 52 is moved, the clutch pressing member 44 presses the friction clutch 41 by being pushed forward in the axis direction of the rear wheel output shaft 6 and increases a clutch pressing force in accordance with the rotation amount of the actuator 70.

By contrast, a reverse operation by rotating the plate cam 60 in an opposite manner releases the engagement of the friction clutch 41. This allows the clutch pressing member 44 of the friction clutch 41 to move in a varying pattern which corresponds to a shape of a cam face formed on the outer surface of the plate cam 60.

According to the configuration of the transfer 1 in the embodiment, the following effects are obtained.

(1) Since the cam follower 56 is rotationally driven along the cam face of the plate cam 60, the drive cam plate 52 of the ball cam mechanism 50 can be moved at a small rotation angle of the actuator 70 for a long travel distance for shifting to a clutch engaged state from a clutch engagement released state in which clutch plates of the friction clutch 41 are separated, as compared to a configuration to rotationally drive a drive cam plate by a pinion gear.

(2) The sliding leg 33a of the slide holder 33 arranged to have both the function of holding both edges of the coil spring 34 via the washer 36 and the function of operating the coil spring 34 allows the slide holder 33 to have an enough movement stroke in an axis direction of the shift rod with respect to the fork main body 32. The movement stroke required for the slide holder 33 is ensured and the length of the fork main body 32 is not unnecessarily increased.

(3) The enough length of the fork main body 32 in the axis direction of the shift rod is ensured for the movement stroke of the sliding leg 33a at least for passing by the spring load receiving portion 32a of the fork main body 32 since the sliding leg 33a of the slide holder 33 provides the spring holding function and the spring operation function, and the shift mechanism 30 having two advantages, downsizing and shortening of the fork main body 32, is obtained as long as minimum inner space required for assembling the slide holder 33 and the coil spring 34 is ensured.

Overall Structure of Shift/Clutch Control Mechanism

The essential basic structure of the present embodiment is a shift/clutch control mechanism 80 shown in FIG. 2, which controls the shift mechanism 30 and the friction clutch device 40. Components of the transfer 1 configured as described above is not different in the basic structure from those of the conventional transfer, apart from the configurations of the shift mechanism 30 and the ball cam mechanism 50. Accordingly, the basic structure of the transfer 1 is not limited to the illustrated example.

The typical shift/clutch control mechanism 80 in the present embodiment allows a single actuator 70 to individually control the switching operation of the sub transmission 20 and the disconnecting operation of the friction clutch device 40. In the illustrated example, a clutch is controlled by rotation in one direction (clockwise) starting from a shift position (position of the high speed stage H) as a control origin and a shift of the sub transmission 20 is controlled by rotation in another direction (counterclockwise) opposite to the one direction starting from the shift position (position of the high speed stage H) as a control origin.

As shown in FIGS. 1 and 2, the shift/clutch control mechanism 80 is mainly composed of the shift cam 37 for linearly moving the shift mechanism 30 along the shift rod 35, the plate cam 60 for changing the clutch pressing force of the friction clutch 41, and a rotary drive member 81 for individually rotationally driving the shift cam 37 and the plate cam 60. The shift cam 37, the plate cam 60 and the rotary drive member 81 are arranged coaxially with the actuator output shaft 72 and are operated in accordance with the rotation amount of the actuator 70.

Structure of Rotary Drive Member

Figure 3:
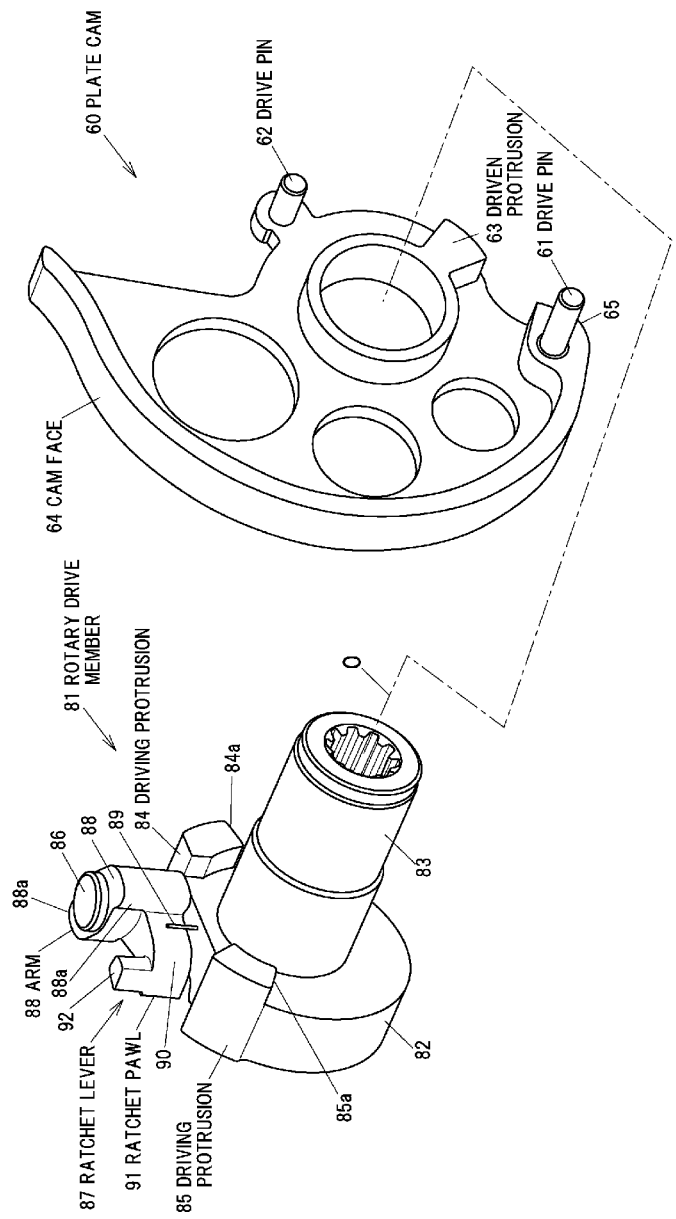
FIG. 3 is an exploded perspective view showing a rotary drive member and a friction clutch driving cam which are preferably used for the shift/clutch control mechanism of the invention.

As shown in FIGS. 2 and 3, the rotary drive member 81 is a cylindrical body of which peripheral surface has a level difference by integrally forming a large diameter portion 82 arranged on a side facing the shift cam with a small diameter portion 83 arranged on a side facing the plate cam in a direction of center line O. The large diameter portion 82 is relatively rotatably supported by the shift rod 35 so as to face the end face of the shift cam 37, as shown in FIGS. 1 and 2. The rotary drive member 81 is supported by the actuator output shaft 72 in a state that an inner peripheral portion of the small diameter portion 83 on the plate cam side is fixed by a spline. The plate cam 60 is relatively rotatably supported on the outer periphery of the small diameter portion 83.

As shown in FIGS. 2 and 3, a pair of rectangular protrusions, a driving protrusion 84 for clutch control mechanism and a driving protrusion 85 for shift control mechanism, is formed on the large diameter portion 82 of the rotary drive member 81 so as to protrude toward the plate cam 60. The driving protrusions 84 and 85 are arranged on the same circumference as the large diameter portion 82 so as to have a predetermined phase difference. The driving protrusion 84 has a driving face 84a which contacts with a driven protrusion 63 formed on the plate cam 60 by clockwise rotary drive of the rotary drive member 81 and synchronously rotates the plate cam 60. Meanwhile, the driving protrusion 85 has a stopper surface 85a which contacts with the driven protrusion 63 of the plate cam 60 by counterclockwise rotary drive of the rotary drive member 81 and stops the operation of the rotary drive member 81.

On the flat outer surface of the large diameter portion 82 which is formed by cutting a portion between the pair of driving protrusions 84 and 85, a ratchet lever 87 is supported via a rotary shaft 86 extending in a normal direction with respect to the outer surface so as to be bi-directionally rotatable, as shown in FIGS. 2 and 3. The ratchet lever 87 is biased by a spring 89 toward the end face of the shift cam 37, and is rotated in a direction orthogonal to the rotational direction of the rotary drive member 81.

As shown in FIGS. 2 and 3, a ratchet 90 provided about the rotary shaft 86 is integrally formed with the ratchet lever 87 at a rotating base. A ratchet pawl 91 as a drive pawl of the ratchet 90 is formed to have an outer shape which can drive the end face of the shift cam 37 both in a shift direction (counterclockwise) and in a restoring direction (clockwise) opposite thereto. The ratchet pawl 91 moves against an elastic force of the spring 89 and is thus engageable with and disengageable from a ratchet groove 38 formed on the end face of the shift cam 37. A protruded portion 92 is formed on the outer surface of the ratchet pawl 91 in a protruding manner to prevent engagement with the ratchet groove 38 at the time of returning after completion of the shift.

A pair of arms, an arm 88 on the shift cam 37 side and an arm 88 on the plate cam 60 side which are orthogonal to the rotary shaft 86, is integrally formed on the ratchet lever 87, as shown in FIGS. 2 and 3. The pair of arms 88 slopes in a clockwise direction about a rotation center line of the rotary drive member 81. Cam faces 88a, 88a are formed on side surfaces of the pair of arms 88 in a clockwise direction so as to be symmetrical about the rotary shaft 86. The pair of cam faces 88a has a function of preventing synchronous rotation of the rotary drive member 81 with the shift cam 37 by disengaging the ratchet pawl 91 from the ratchet groove 38 of the shift cam 37 when the rotary drive member 81 is rotationally driven in the restoring direction which is opposite to the shift direction.

Structure of Shift Control Mechanism

Meanwhile, as shown in FIGS. 2 and 3, a pair of long and short cylindrical-shaped drive pins 61 and 62 is formed to protrude from a surface of the plate cam 60 which faces the rotary drive member 81. The long drive pin 61 is arranged within a rotation locus of the arm 88 of the ratchet lever 87 which is located on the shift cam 37 side. Meanwhile, the short drive pin 62 is arranged within a rotation locus of the arm 88 of the ratchet lever 87 which is located on the plate cam 60 side.

Referring to FIGS. 2 and 3, the long drive pin 61 contacts with and presses the cam face 88a of the arm 88 on the shift cam 37 side to move the ratchet pawl 91 out of the rotation locus of the ratchet groove 38 of the shift cam 37, thereby releasing the ratchet pawl 91. On the other hand, the short drive pin 62 contacts with and presses the cam face 88a of the arm 88 of the ratchet lever 87 on the plate cam 60 side to release the ratchet pawl 91.

The shift control mechanism is mainly composed of the ratchet groove 38 of the shift cam 37, the drive pins 61 and 62 of the plate cam 60, and the driving protrusion 85 and the ratchet lever 87 of the rotary drive member 81. Since the ratchet lever 87 is configured to be fixedly supported about the axis line in a normal direction with respect to the rotation center line of the rotary drive member 81 so as to be relatively rotatable in both directions, it is possible to reduce a rotating operation angle of the ratchet pawl 91 which is required to disengage the ratchet pawl 91 from the ratchet groove 38.

Referring to FIGS. 4A to 4D, an assembled state of the shift cam 37, the plate cam 60 and the rotary drive member 81 is shown as a developed view. In FIGS. 4A to 4D, two check grooves 39 located on both sides of a check ball 104, the ratchet grooves 38, the drive pins 62 and the driven protrusions 63 separately illustrated in the developed view are respectively the selfsame components.

Figure 4A:
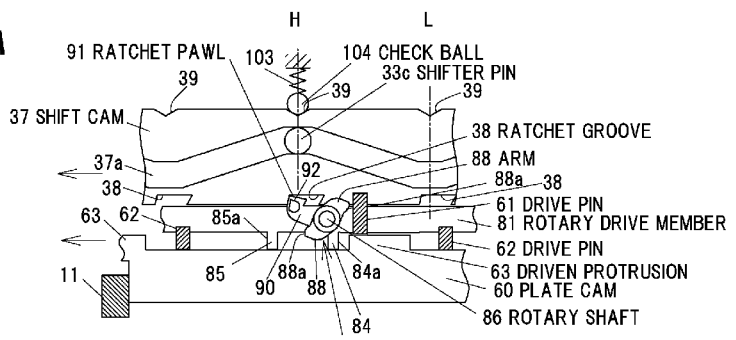
FIG. 4A is an explanatory diagram illustrating the assembled state of the shift/clutch control mechanism of the invention and FIGS. 4B to 4D are explanatory diagrams illustrating shift control.

In FIG. 4A, the actuator output shaft 72 and the shift cam 37 are positioned at a control origin, and the shift position of the shift cam 37 is the position of the high speed stage H (the H position). A position where the stopper surface 85*a* of the driving protrusion 85 of the rotary drive member 81 is separated from the driven protrusion 63 of the plate cam 60 is a control starting position of the shifter pin 33*c* of the shift mechanism 30 which moves in the cam groove 37*a* of the shift cam 37.

Figure 4B:
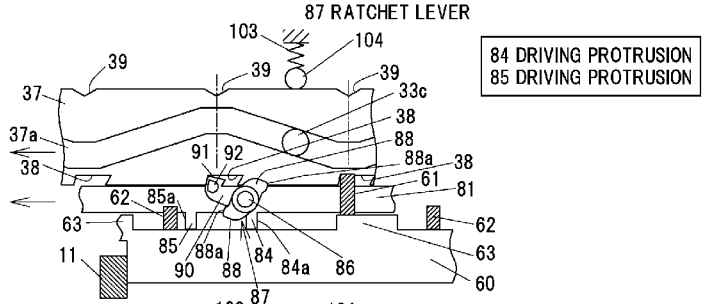

FIG. 4B shows forward rotation for switching a shift, where the rotary drive member 81 is rotationally driven counterclockwise (the rotary drive member 81 is moved leftward in the developed view) to rotationally drive the shift cam 37 counterclockwise together with the rotary drive member 81. The shift cam 37 and the rotary drive member 81 are integrally rotated in an engaged state in which the ratchet pawl 91 of the rotary drive member 81 is hooked in the ratchet groove 38 of the shift cam 37. The plate cam 60 remains at the control starting position and is not moving.

Figure 4C:
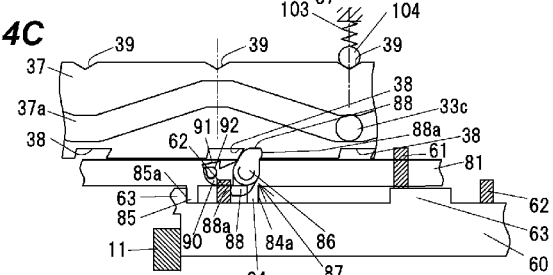

When the rotation angle of the rotary drive member 81 reaches 180°, the check ball 104 is fitted to the next check groove 39 as shown in FIG. 4C and the shift position is determined to be the position of the low speed stage L (L position). The shifter pin 33*c* of the shift mechanism 30 is guided and moved in an axis direction along the cam groove 37*a* of the shift cam 37 and completes the shift to the L position.

In FIG. 4C, the stopper surface 85*a* of the driving protrusion 85 of the rotary drive member 81 is stopped by contacting with the driven protrusion 63 of the plate cam 60, and the short drive pin 62 of the plate cam 60 contacts with and presses the arm 88 of the ratchet lever 87 on the plate cam 60 side. The ratchet pawl 91 of the ratchet lever 87 is released by counterclockwise rotation about the rotary shaft 86 against the elastic force.

Figure 4D:
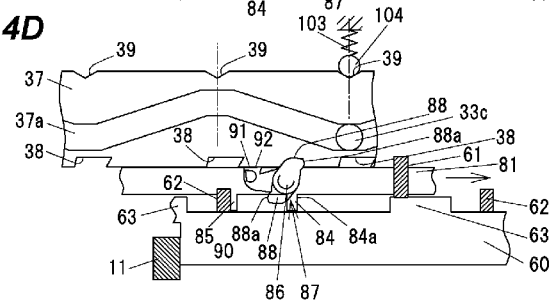

When the ratchet pawl 91 is disengaged from the ratchet groove 38 of the shift cam 37, only the rotary drive member 81 is rotated clockwise to return (restore) (the rotary drive member 81 is moved rightward in the developed view) in a state that the shift cam 37 is left at the shift position, as shown in FIG. 4D. The ratchet pawl 91 is rotated clockwise along the end face of the shift cam 37 and is engaged with the next ratchet groove 38.

In the meantime, if a transmission is operated too quickly after a switching operation of a transfer, a shift fork may be locked up due to an engine driving force which is input during the shift, and may stop moving before completion of the shift. In such a case, it is desirable that a sudden shift operation after a vehicle starts running be avoided by returning the shift fork to an original position. In the shift/clutch control mechanism 80, since it is possible to return the shift fork to the original position even when the shift fork stops moving before the completion of the shift, it is possible to avoid a sudden shift operation after a vehicle starts running.

Switching from the H position to the L position is completed by the shift operation described above. The shift is operated reversely for switching from the L position to the H position in a manner opposite to the above shift operation. Therefore, an explanation of a switching operation from the L position to the H position is omitted.

Structure of Clutch Control Mechanism

As shown in FIGS. 2 and 3, a cam face 64 formed on the outer periphery of the plate cam 60 is formed in a nonlinear shape at a cam leading edge 65 so that the rate of change of distance between the shift rod 35 and the cam face varies in a quadratic curve, and is formed in a linear shape from the cam leading edge 65 throughout in a drive rotational direction. Looseness of the friction clutch 41, which is a gap between the initial position of the friction clutch 41 and the clutch plate, is reduced by the operation of the plate cam 60 at a small rotation angle, thereby making a clutch pressing force act. Therefore, disconnection of the clutch in a section having a long stroke to reach a position on which the clutch pressing force acts can be operated for short time periods by reducing the gap between the initial position of the friction clutch 41 and the clutch plate.

As shown in FIGS. 2 and 3, the plate cam 60 has the driven protrusion 63 formed on the same circumference as that between the driving face 84*a* of the driving protrusion 84 for clutch control mechanism and the stopper surface 85*a* of the driving protrusion 85 for shift control mechanism which are formed to protrude on the rotary drive member 81. The clutch control mechanism is mainly composed of the driven protrusion 63 of the plate cam 60 and the driving protrusion 84 of the rotary drive member 81.

Referring to FIGS. 5A and 5B, the assembled state of the shift cam 37, the plate cam 60 and the rotary drive member 81 is shown as a developed view in the same manner as FIGS. 4A to 4D. In FIG. 5A, a position where the driving face 84*a* of the driving protrusion 84 of the rotary drive member 81 contacts with the driven protrusion 63 of the plate cam 60 by rotationally driving the rotary drive member 81 clockwise (moving the rotary drive member 81 rightward in the developed view) is a control starting position of the ball cam mechanism 50.

In the ball cam mechanism 50, when the rotary drive member 81 is rotationally driven clockwise, the arm 88 on the shift cam 37 side of the ratchet lever 87 of the rotary drive member 81 contacts with and is pressed by the long drive pin 61 of the plate cam 60, as shown in FIG. 5B. The ratchet pawl 91 of the ratchet lever 87 is released by counterclockwise rotation about the rotary shaft 86 against the elastic force.

The driven protrusion 63 of the plate cam 60 receives a pressing load from the driving face 84*a* of the driving protrusion 84 of the rotary drive member 81, as shown in FIG. 5B. The rotary drive member 81 rotationally drives the plate cam 60 clockwise in a state that the shift cam 37 remains at the H position or the L position. At this time, the ratchet pawl 91 is maintained in a released state by action of the drive pin 61.

The plate cam 60 is rotationally driven clockwise together with the rotary drive member 81, and the drive cam plate 52 is rotationally driven in a certain direction with respect to the reaction cam plate 51 in accordance with the rotation of the plate cam 60 by the rotary drive member 81. The drive cam plate 52 presses the friction clutch 41 via the cam follower 56 while receiving pressure from the ball 57 in the ball cam mechanism, thereby increasing the clutch pressing force. By contrast, counterclockwise rotation of the rotary drive member 81 reduces the clutch pressing force in accordance with the rotation of the plate cam 60 in the reverse manner to the above operation.

The following effects are obtained by the shift/clutch control mechanism 80 in the embodiment.

(1) Since the ratchet lever 87 is attached to rotate in a direction orthogonal to the rotational direction of the rotary drive member 81, it is possible to reduce the rotating operation angle of the ratchet pawl 91 which is required for disengagement from the ratchet groove 38 and it is thus possible to reduce the shift time.

(2) Since the time for switching the shift mechanism 30 is short, the rotary drive member 81 does not stop moving in the middle of shifting. It is possible to return the rotary drive member 81 to the original position even in the case of stoppage in the middle of shifting.

(3) Since the driving protrusion 85 of the rotary drive member 81 and the driven protrusion 63 of the plate cam 60 are configured to correspond to a shift end of the shift cam 37, the rotary drive member 81 does not overrun at the shift end and it is possible to certainly complete the shift even when variably controlled.

Structure of Check Mechanism

Figure 6:
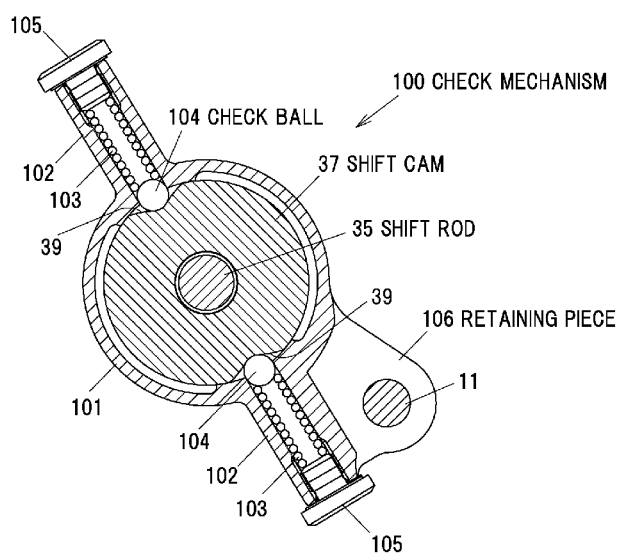
FIG. 6 is a cross sectional view showing a check mechanism which is preferably used for the shift/clutch control mechanism of the invention.

As shown in FIGS. 1, 2 and 6, a check mechanism 100 constituting another essential part of the shift/clutch control mechanism 80 is supported coaxially with the shift cam 37 at the end portion on the rotary drive member side. The check mechanism 100 is to determine the shift position of the shift cam 37, and is provided with a circular box-shaped check portion 101 relatively rotated with respect to the shift cam 37 and a pair of long cylindrical-shaped check blocks 102 integrally formed with the check portion 101.

The check blocks 102 are radially extended outward from the outer periphery of the check portion 101 so as to have the same phase difference, as shown in FIGS. 2 and 6. The check ball 104 pressed against the check groove 39 of the shift cam 37 by an elastic repulsion force (a biasing force) of a coil spring 103 is provided in the check block 102. An end opening of the check block 102 is closed by a plug 105.

The check groove 39 with which the check ball 104 is fitted and engaged is formed at the end portion of the shift cam 37, as shown in FIGS. 2 and 6. The check groove 39 of the shift cam 37 is formed so as to correspond to two shift ends which are shift positions determined by the ratchet groove 38 of the shift cam 37. The shift position of the sub transmission 20 is determined to be either the H position or the L position by engagement of the check ball 104 with the check groove 39.

As shown in FIGS. 2 and 6, a flat retaining piece 106 as a whirl-stop of the check mechanism 100 is integrally formed between one of the pair of check blocks 102 and the check portion 101. The positioning rod 11, which prevents reverse rotation of the plate cam 60 and supports the reaction cam plate 51, penetrates through and supports the retaining piece 106.

In the meantime, when the driving force of the actuator 70 is lost in the state that the friction clutch 41 is pressed, the actuator 70 may be reversely driven by a repulsion force of the ball cam mechanism 50.

In another basic structure of the present embodiment, check torque of the check mechanism 100 and a rotation angle are set so that absorbed energy of the check mechanism 100 is greater than energy emitted during reverse drive of the actuator 70 caused by the repulsion force of the friction clutch 41.

Here, the absorbed energy of the check mechanism 100 is calculated from the check torque of the check mechanism 100 and the rotation angle of the shift cam 37. The check torque is resistant torque by which the check ball 104 engaged with the check groove 39 while being biased by an elastic force of the coil spring 103 is disengaged from the check groove 39 against the biasing force of the coil spring 103. The absorbed energy of the check mechanism 100 is calculated by the following formula (1).

Absorbed energy of the check mechanism 100=Resistance torque of the check mechanism 100×Rotation angle of the shift cam 37 (1)

The following effects are obtained by the check mechanism 100 in the embodiment.

(1) By setting the absorbed energy of the check mechanism 100 to have the relation represented by the formula (1), it is possible to prevent the sub transmission 20 from switching while a vehicle is moving without rotationally driving the shift cam 37 in a shift direction in case of, e.g., a failure such that the drive of the actuator 70 is lost even when the transfer 1 is configured to control the clutch and the shift by the single actuator 70.

(2) Since a pair of check balls 104 is provided at opposite positions on the circular circumference of the check portion 101, it is possible to generate strong check torque by the check ball 104 and the coil spring 103 which are cheap.

Structure of Shutter Mechanism

If the ratchet pawl 91 of the ratchet lever 87 gets stuck in the ratchet groove 38 of the shift cam 37 at the time of rotationally driving the rotary drive member 81 in a restoring direction from the shift position (an end portion of the cam groove) as the L position of the shift cam 37 as shown in FIGS. 4C and 4D, the shift cam 37 is rotated together with the rotary drive member 81.

Figure 7:
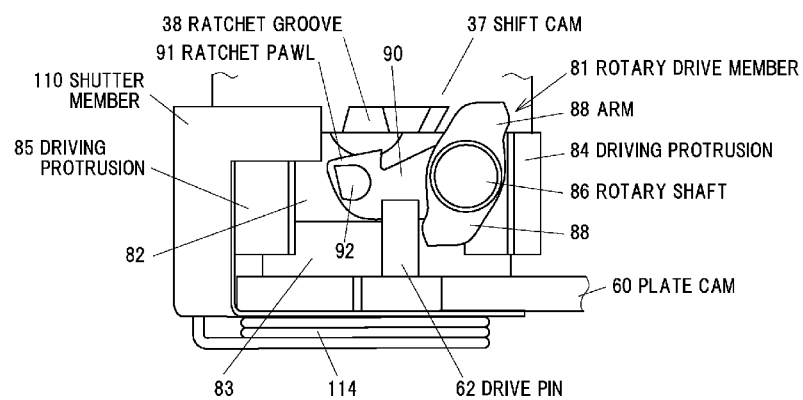
FIG. 7 is a top view showing a shutter mechanism which is preferably used for the shift/clutch control mechanism of the invention.
Figure 8:
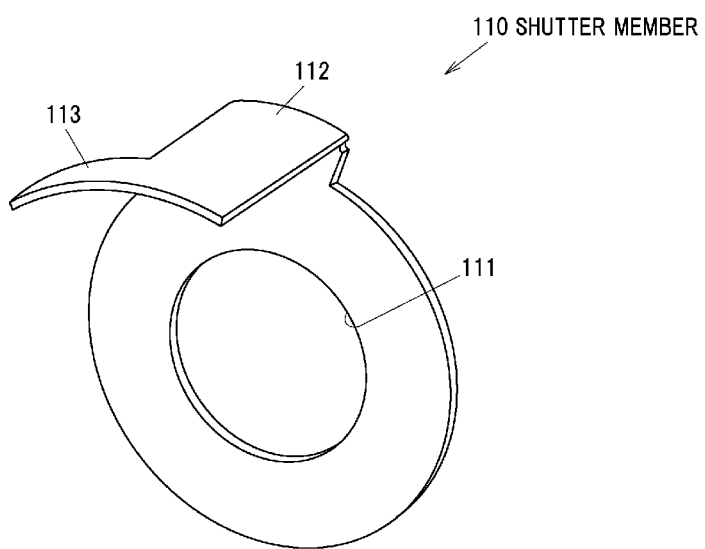
FIG. 8 is a perspective view showing a shutter member of the shutter mechanism of the invention.

In the present embodiment, a shutter member 110 constituting another essential part of the shift/clutch control mechanism 80 is relatively rotatably attached to the rotary drive member 81 via the plate cam 60, as shown in FIGS. 7 and 8. It is possible to prevent the ratchet pawl 91 of the ratchet lever 87 from getting stuck in the ratchet groove 38 by the shutter member 110.

As shown in FIGS. 7 and 8, the shutter member 110 is formed of a circular thin plate having an insertion hole 111. A first protruding piece 112 protruding from the outer peripheral side of the thin plate is bent in a direction orthogonal to the rotary drive member, and a second protruding piece 113 extends from the front edge of the first protruding piece 112 in a circumferential direction. The first protruding piece 112 and the second protruding piece 113 are designed to have a shape with the same curvature as the circular thin plate. The shutter member 110 is biased by a torsion spring 114 in a direction in which the second protruding piece 113 contacts with the protruded portion 92 of the ratchet lever 87.

Figure 9A:
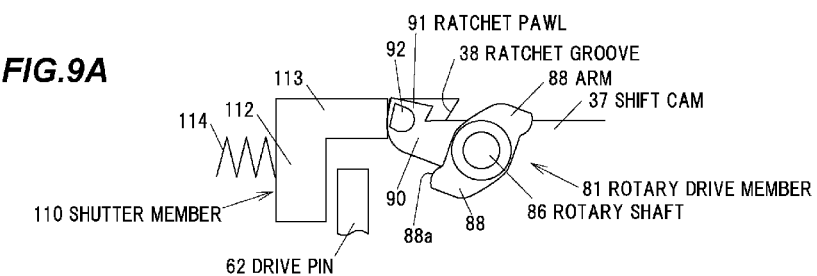
FIGS. 9A to 9D are explanatory diagrams illustrating motion of the shutter mechanism of the invention.
Figure 9B:
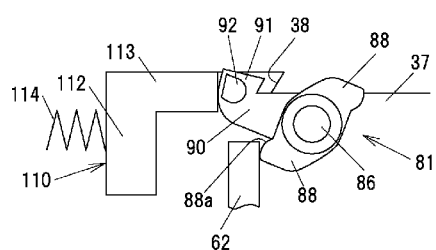
Figure 9C:
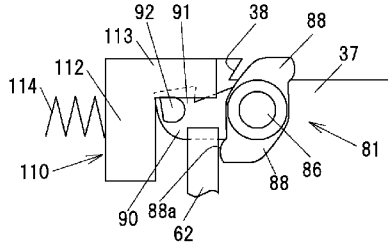
Figure 9D:
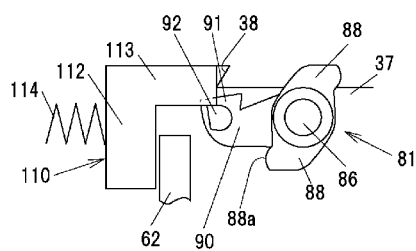

FIGS. 9A to 9D schematically shows motion of the shutter member 110 during the rotational drive of the rotary drive member 81 in a shift direction of the shift cam 37 (toward the end portion of the cam groove) until the rotational drive thereof in a restoring direction. As shown in FIG. 9D, the shutter member 110 is arranged such that the torsion spring 114 makes the second protruding piece 113 block the ratchet groove 38 of the shift cam 37.

As shown in FIG. 9A, motion of the rotary drive member 81 rotationally driven in a direction toward the end portion of the cam groove of the shift cam 37 makes the protruded portion 92 of the ratchet lever 87 of the rotary drive member 81 contacts with and apply a pressing load to the second protruding piece 113 of the shutter member 110 against an elastic force of the torsion spring 114. As shown in FIG. 9B, the arm 88 of the ratchet lever 87 contacts with the short drive pin 62 of the plate cam 60 in accordance with the rotary drive of the rotary drive member 81. As shown in FIG. 9C, the ratchet lever 87 is rotated counterclockwise about the rotary shaft 86 by the pressing load of the short drive pin 62 of the plate cam 60 in accordance with the rotary drive of the rotary drive member 81. The ratchet pawl 91 of the ratchet lever 87 is disengaged from the ratchet groove 38 of the shift cam 37 and is then released.

When the ratchet pawl 91 is released, the protruded portion 92 of the ratchet lever 87 rides over the second protruding piece 113 of the shutter member 110 against the elastic force, and the ratchet pawl 91 is pushed in the shutter member 110. At this time, the shutter member 110 is released from the pressure of the protruded portion 92 of the ratchet lever 87 as shown in FIG. 9C and returns to the initial position by the elastic repulsion force of the torsion spring 114, thereby blocking the ratchet groove 38 of the shift cam 37.

The released state of the ratchet lever 87 is maintained until the protruded portion 92 of the ratchet lever 87 comes out from the shutter member 110 as shown in FIGS. 9C and 9D.

The following effect is obtained by the configuration of the shutter mechanism in the embodiment.

(1) Since the shutter member 110 prevents the ratchet pawl 91 from getting stuck in the ratchet groove 38 of the shift cam 37 when the rotary drive member 81 returns to the control origin after the completion of the shift, it is possible to prevents the ratchet pawl 91 from being hooked in the ratchet groove 38 and to prevent the shift cam 37 from rotating.

As is obvious from the above description, although the driving force distribution device of the invention has been described based on the embodiment and the illustrated example, the invention is not intended to be limited thereto, and the various kinds of embodiments can be implemented without departing from the gist of the present invention. It is also possible to implement a following modification in the invention.

Modifications

Figure 10:
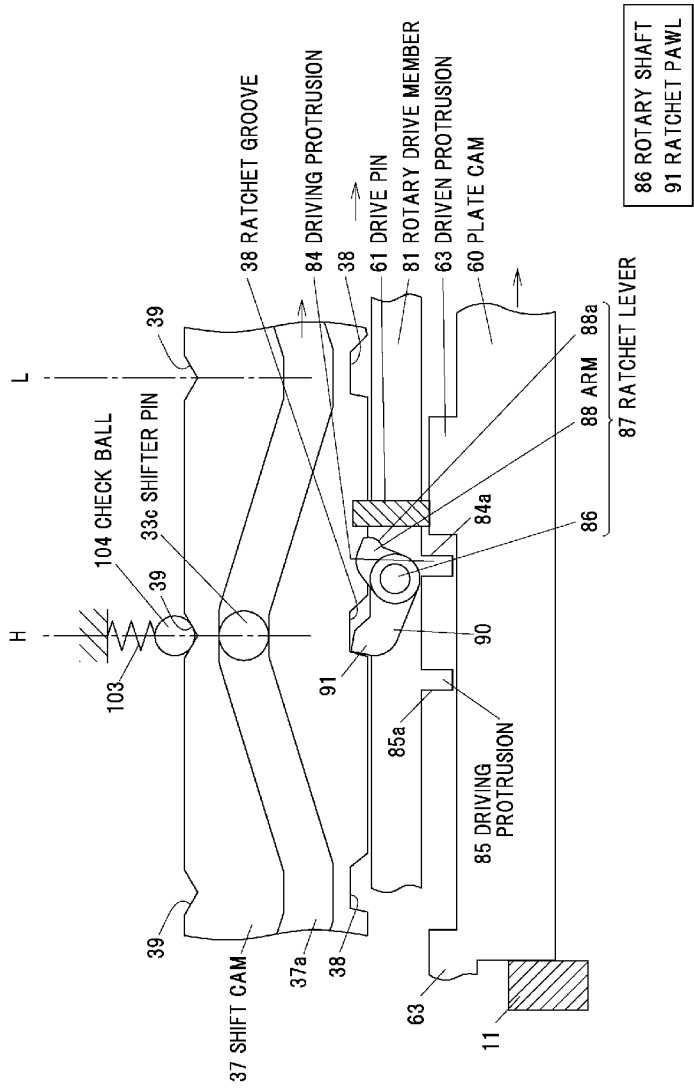
FIG. 10 is an explanatory diagram illustrating the assembled state of another shift/clutch control mechanism of the invention.

Although the rotary drive member 81 having a pair of arms 88 is exemplified in the embodiment, it is not limited thereto. As an exemplary modification of the rotary drive member 81, the ratchet pawl 91 is a so-called unidirectional drive which can be driven in a shift direction (leftward in the drawing) but cannot be driven to return after completion of the shift, and an arm 88 on a shift direction side of the shift cam 37 (direction in which the shift cam 37 moves leftward in the developed view) is eliminated, as shown in FIG. 10.

In this configuration, the shifting time is enough short to prevent a problem in which the shift fork cannot be returned to the original position when the shift fork stops moving in the middle of shifting, and also to reduce the manufacturing cost. The short drive pin 62 and the shutter member 110 are not required when adopting this configuration, and it is thus possible to reduce the manufacturing cost. It should be noted that the members substantially the same as those in the embodiment are denoted by the same names and the same reference numerals in FIG. 10. Therefore, the detailed descriptions of such members are omitted.

Although the case where the driving force distribution device of the invention is used for a transfer of a four-wheel-drive vehicle using a FR-type system has been described in the embodiment, it is obvious that the invention is not limited thereto. It is possible to effectively use the driving force distribution device of the invention for, e.g., a transfer of a four-wheel-drive vehicle using a FF-type system. In addition, although the sub transmission 20 for switching between the H position and the L position to change the running speed has been described in the embodiment, the invention is not limited thereto. In the invention, it is possible to add various positions such as, e.g., neutral position or 4WD lock position as a switching position in a sub transmission.

Note that, it is obvious that it is possible to effectively use the driving force distribution device of the invention for various types of vehicles such as motorcycle or work vehicle, e.g., agricultural machines, construction and earth-moving machines and transporting machines.

What is claimed is:

1. A driving force distribution device, comprising:
   a sub transmission for switching motive power to an input shaft between at least two levels, a high speed and a low speed, and transmitting the motive power to a primary output shaft;
   a friction clutch for transmitting the motive power of the primary output shaft to a secondary output shaft;
   a rotary drive member fixed to an output shaft of an actuator;
   a friction clutch driving cam coaxially and relatively rotatably arranged at one end portion of the rotary drive member to change a pressing force of the friction clutch;
   a shift cam coaxially and relatively rotatably arranged at another end portion of the rotary drive member to shift the sub transmission by converting rotary motion of the actuator into linear motion; and
   a ratchet lever provided so that a shaft line thereof in a normal direction with respect to the outer surface of the rotary drive member is a rotation center,
   wherein the ratchet lever is disengaged from the shift cam and is rotated when the rotary drive member is rotationally driven to one side from a predetermined position starting at control origin of the shift cam, and the ratchet lever is rotated in conjunction with the shift cam when the rotary drive member is rotationally driven in a direction opposite to the one side.

2. The driving force distribution device according to claim 1, wherein the ratchet lever comprises a drive pawl for rotating the shift cam by engaging with a ratchet groove formed on the shift cam, and an arm integrally formed with the drive pawl, the arm contacting with a drive pin provided on the friction clutch driving cam to rotate and retract the drive pawl to a released position where the drive pawl does not engage with the ratchet groove.

3. The driving force distribution device according to claim 1, wherein the rotary drive member comprises a first driving protrusion to rotate by contacting with a driven protrusion formed on the friction clutch driving cam to adjust a pressing force of the friction clutch when the rotary drive member is rotationally driven to the one side, and a second driving protrusion to contact with the driven protrusion to stop the rotary drive member when the rotary drive member is rotationally driven in a direction opposite to the one side, and
   wherein the rotary drive member returns to the control origin after the second driving protrusion stops moving and the position of the sub transmission is shifted while the shift cam is in a stop state.

4. The driving force distribution device according to claim 2, further comprising:
   a shutter member for preventing engagement between the drive pawl and the ratchet groove by lying therebetween when the drive pawl is rotated and retracted to a released position not engaging with the ratchet groove by contacting the arm with the drive pin.

5. The driving force distribution device according to claim 1, further comprising:
   a check mechanism coaxially supported by the shift cam for determining the shift positions so as to correspond to two shift positions of the shift cam.

6. The driving force distribution device according to claim 5, wherein the check mechanism comprises a retaining piece for stopping rotation of the shift cam, and the retaining piece is supported by a positioning rod that penetrates therethrough and prevents reverse rotation of the friction clutch driving cam.

7. The driving force distribution device according to claim 1, further comprising:
   a ball cam mechanism for displacing the friction clutch in an axis direction,
   wherein the ball cam mechanism comprises a pair of ball cams arranged coaxially with the friction clutch so as to be relatively rotatable each other and having a ball sandwiched between surfaces facing each other, one of the ball cams is fixedly supported by the positioning rod that prevents reverse rotation of the friction clutch driving cam, and another ball cam is driven via a cam follower that moves along a cam face of the friction clutch driving cam.

* * * * *